(12) United States Patent
Burns

(10) Patent No.: US 7,028,947 B2
(45) Date of Patent: Apr. 18, 2006

(54) SELF-POWERED TETHERED DECOY FOR HEAT-SEEKING TRANSPORT AIRCRAFT MISSILE DEFENSE

(75) Inventor: Alan Alexander Burns, Portola Valley, CA (US)

(73) Assignee: Mlho, Inc., Portola Valley, CA (US)

( * ) Notice: Subject to any disclaimer, the term of this patent is extended or adjusted under 35 U.S.C. 154(b) by 0 days.

(21) Appl. No.: 11/089,694

(22) Filed: Mar. 25, 2005

(65) Prior Publication Data

US 2006/0060691 A1    Mar. 23, 2006

Related U.S. Application Data

(60) Provisional application No. 60/567,313, filed on Apr. 30, 2004.

(51) Int. Cl.
*B65D 47/00* (2006.01)

(52) U.S. Cl. .................................. 244/1 TD

(58) Field of Classification Search ............ 244/1 TD, 244/135 A, 137.4, 136; 102/400, 336; 342/13; 250/340, 341.6
See application file for complete search history.

(56) References Cited

U.S. PATENT DOCUMENTS

| | | | |
|---|---|---|---|
| 3,150,848 A | | 9/1964 | Lager |
| 3,699,576 A | * | 10/1972 | Hoyer .......................... 342/10 |
| 3,715,760 A | * | 2/1973 | Palmer ........................ 343/915 |
| 4,498,392 A | | 2/1985 | Brillard. |
| 4,659,034 A | * | 4/1987 | Diekmann ................ 244/1 TD |
| 5,074,216 A | | 12/1991 | Dunne et al. |
| 5,136,295 A | | 8/1992 | Bull et al. |
| 5,186,413 A | * | 2/1993 | Deakin ..................... 244/1 TD |
| 5,224,663 A | * | 7/1993 | Criswell ..................... 244/1 R |
| 5,327,069 A | | 7/1994 | Radun et al. |
| 5,333,814 A | * | 8/1994 | Wallis ...................... 244/1 TD |
| 5,497,156 A | * | 3/1996 | Bushman ....................... 342/9 |
| 5,544,484 A | | 8/1996 | Voss |
| 5,565,645 A | | 10/1996 | Tappan et al. |
| 5,570,854 A | | 11/1996 | Brun |
| 5,606,247 A | | 2/1997 | Sutrina |
| 5,871,173 A | * | 2/1999 | Frank et al. .............. 244/1 TD |
| 5,899,411 A | | 5/1999 | Latos et al. |

(Continued)

OTHER PUBLICATIONS

Vol. 7. Countermeasure Systems, Pollock, David H., ed., 1993, pp. 242-245; The Infrared and Electro-Optical Systems Handbook, Infrared Research Analysis Center, Environmental Research Institute of Michigan, Ann Arbor, MI, and SPIE Optical EngineeringPress, Bellingham, WA.

*Primary Examiner*—Michael Carone
*Assistant Examiner*—John A Radi
(74) *Attorney, Agent, or Firm*—David E. Newhouse, Esq.

(57) ABSTRACT

A low-cost airliner defense system utilizing self powered, retrievable, towed decoys against man portable heat-seeking missile (MANPAD) systems provides both high power and a large IR radiating surface area. An efficient and lightweight integrated turbine-alternator extracts sufficient electric power from an air stream directed through a small decoy deployed and towed behind an aircraft during the vulnerable phases of a flight to power a large and intense IR emitter. Unfurled IR radiator "petals" present large area arrays of rear-facing IR emitters. During the high-altitude cruise phase the radiating petals furl down folding around the retrieved decoy body as it is stowed in a streamlined housing for minimizing fuel consumption and maneuverability penalties.

12 Claims, 11 Drawing Sheets

U.S. PATENT DOCUMENTS

| | | |
|---|---|---|
| 6,056,236 A * | 5/2000 | Weimer et al. ........... 244/1 TD |
| 6,267,039 B1 | 7/2001 | Czarnecki |
| 6,352,031 B1 | 3/2002 | Barbaccia |
| 6,467,725 B1 | 10/2002 | Coles et al. |
| 6,662,700 B1 | 12/2003 | O'Neill |
| 6,663,049 B1 | 12/2003 | Jakubowski |
| 6,683,555 B1 | 1/2004 | Carlson et al. |
| 6,724,114 B1 | 4/2004 | Horst |
| 6,779,796 B1 | 8/2004 | Carlson et al. |
| 6,869,043 B1 * | 3/2005 | Carlyle et al. ............. 244/3.28 |
| 6,904,838 B1 * | 6/2005 | Dindl ........................ 89/1.1 |
| 2003/0071164 A1 * | 4/2003 | Carlson et al. ........... 244/1 TD |
| 2003/0116050 A1 | 6/2003 | Brum et al. |
| 2003/0122699 A1 | 7/2003 | Carlson et al. |
| 2004/0050998 A1 * | 3/2004 | Edwards ..................... 244/10 |
| 2005/0045768 A1 * | 3/2005 | Saggio et al. ........... 244/135 A |
| 2005/0062638 A1 * | 3/2005 | Zeineh ........................ 342/13 |
| 2005/0178873 A1 * | 8/2005 | Sullivan .................. 244/1 TD |

* cited by examiner

SELF-POWERED TETHERED DECOY FOR HEAT-SEEKING TRANSPORT AIRCRAFT MISSILE DEFENSE

CROSS-REFERENCES TO RELATED APPLICATIONS

This application claims all benefits conferred by reason of U.S. Provisional Application No. 60/567,313 filed 30 Apr. 2004 by Applicant Alan Alexander Burns of Portola Valley CA entitled "Self Powered Tethered Reusable Sacrificial Decoy for Heat Seeking Transport Aircraft Defense".

STATEMENT REGARDING FEDERALLY SPONSORED RESEARCH AND DEVELOPMENT

Not applicable.

BACKGROUND

1. Field of Invention

This invention relates to defending aircraft against missile attack.

2. Introduction

Heat-seeking MANPAD (Man Portable Air Defense) systems such as the FIM-92 Stinger missile present a critical and pressing terrorist threat to commercial air transport aircraft. The most vulnerable phases of flight are during landing approach and immediately after takeoff. Also many landing approach profiles require prolonged flight at low altitudes over populated areas. Nevertheless, although the stakes are high, the probability that any particular transport would ever be attacked is very low. For society, this situation produces a cost-effectiveness conundrum. A desirable missile defense system for transports must operate continuously, effectively, reliably, and economically.

Various systems have been proposed to defeat infrared (IR) missile threats. Pyrotechnic flares are used traditionally for this purpose, but have short effective time durations. Routinely dispensing flares to draw possible MANPAD missiles away from a transport is clearly unacceptable. Dispensing flares or recoverable decoys when an attack is detected requires a sophisticated and costly missile attack sensing system. Recurring false alarms would likely cause unacceptable hazards from flares to people and property. Tethered decoys have also been proposed. Non-predeployed recoverable decoys must be deployed quickly after receiving a warning, which places stringent requirements on the tether line and requires a complex release and recovery system. Decoys must also radiate considerable IR power, which limits operating duration or requires significant power-carrying capacity by the tether. Fueled decoys must be refueled and battery-operated decoys need to be recharged or replaced, requiring costly and time-consuming ground operations. Another issue is handling potentially hazardous materials at passenger terminals.

To be effective, a passive decoy must radiate IR energy at levels comparable to or exceeding that of an airliner. The hot parts (mainly the turbine plates) of transport aircraft engines present areas of about 0.5 m² at temperatures ranging around 750 K radiating at about 1500 W/sr, primarily in the rearward direction. (See Volume 7. *Countermeasure Systems*, Pollock, David H., ed., 1993, pp. 242–245; & *The Infrared and Electro-Optical Systems Handbook*, Infrared Research Analysis Center, Environmental Research Institute of Michigan, Ann Arbor, Mich., and SPIE Optical Engineering Press, Bellingham, Wash.)

Active jamming systems, including Directed InfraRed Counter Measures (DIRCM), have also been strongly advocated. A typical proposed DIRCM system comprises three principal components: (1) a missile attack warning system; (2) data processing system; and, (3) a directed high-power laser in a gimbaled turret. At an estimated cost of $1–2M or greater per aircraft for such systems, outfitting the 7000-aircraft US commercial transport fleet is clearly an extremely expensive proposition.

A cost-effective, long-term realistic solution addressing terrorist threats inherent in the existence of simple heat-seeking man portable missile systems, whether defensive or offensive, is urgently needed.

My invention system of deploying and retrieving a self energized, radiating decoy from a host commercial aircraft during vulnerable stages of a flight can provide significantly lower initial and lifetime costs as well as effective protection against terrorist MANPAD attacks. The mere presence of such a system would decrease the likelihood of such attacks because the probability of a successful kill would be significantly reduced without affecting the probability of detecting contemplated attacks planned by terrorists. Most importantly, existing commercial air transport fleets can be easily and relatively inexpensively, retrofitted with the invented system enabling defense and protection of transported civilians at an early date.

Description of Prior Art

Traditional systems for heat-seeking missile defense commonly dispense flares or similar munitions as decoys. For example, U.S. Pat. No. 3,150,848 to Lager discloses energy-radiating masses comprised of metered pyrophoric and oxidizer substances ejected in pulses to decoy heat-seeking missiles. U.S. Pat. No. 4,498,392 to Billard et al. teaches a chain of sequentially ejected pyrotechnic decoys. U.S. Pat. No. 5,074,216 to Dunne et al. discloses a stabilized infrared decoy flare designed to reduce tumbling and cooling after ejection into the airstream. U.S. Pat. No. 5,565,645 to Tappan et al discloses a high-intensity infrared decoy flare that employs unstable combustion during the first 0.2–0.5 second after ejection and ignition. Peak intensity of IR radiation emitted initially by the flare is said to be 826 watts/steradian. During later stable combustion the IR radiation is said to be 450 watts/steradian. These radiation levels are similar to those of jet transport aircraft engines.

U.S. Pat. No. 6,663,049 to Jakubowski et al and U.S. Pat. No. 6,352,031 to Barbaccia describe radiative countermeasures using on-board fuel supplies.

Numerous disclosures teach tethered decoys and means for deploying and recovering tethered decoys. Examples include U.S. Pat. No. 5,136,295 to Bull et al, U.S. Pat. No. 5,570,854 to Brun, U.S. Pat. No. 5,683,555 to Carlson et al, and Patent Application Publication U.S. 2003/0071164 by Carlson et al. U.S. Pat. No. 6,662,700 to O'Neill describes a string of burning flares stored in a dispenser towed behind an aircraft along with a sensor to activate them when a threat is detected.

U.S. Pat. No. 5,497,156 to Bushman discloses a towed target that collects and selectively reflects IR energy from the exhaust plume of a jet engine immediately ahead of the target in order to attract missiles. This is said to produce a greater heat signal that from the engine itself.

U.S. Pat. No. 6,267,039 to Czarnecki discloses an IR lamp mounted on a sacrificial portion of the aircraft structure itself. A missile attracted to the lamp will damage or destroy the sacrificial structure but hopefully not bring down the airplane. The lamp is powered directly by the aircraft electrical system. Czarnecki does not mention deploying the lamp away from the aircraft nor self-powering the IR lamp. Patent Application Publication U.S. 2003/0116050 by Brum et al discloses an electrically heated radiation augmenter to attract heat-seeking missiles to a towed body. The augmenter is said to operate at 1400 F (1050 K) emit 40 watts/steradian in the 3–5 micron band. Assuming a grey-body Lambertian surface and emissivity=1, the surface area of the Brum emitter is only about 50 cm2. Therefore, both the radiating area and radiant intensity of the Brum emitter are very small (1%) compared to those of a transport jet engine. The power source for the heater is not described but is said to be either internal or provided externally by means of the tow line. Brum et al do not disclose use of an internal or external turbine or alternator.

U.S. Pat. No. 5,333,814 to Wallis teaches a maneuverable towed body for intercepting missiles. The Wallis system requires active missile detection and tracking means to maneuver the decoy into the path of an attacking missile, but the actual means are not discussed. The maneuverable body contains small IR emitters for attracting missiles and employs a propeller beyond the tail as a conventional external ram air turbine (RAT) to power the body. Wallis provides no details regarding the generator and does not teach an IR decoy with an internal switched or variable reluctance integrated turbine-alternator, a system for deploying and recovering the decoy, or storing the decoy in a low-drag configuration.

Switched or variable reluctance generators are especially useful in aircraft applications due to their relative lightness. These are often used as emergency power sources. U.S. Pat. No. 5,899,411 to Latos et al describes an emergency power system using a wind-driven turbine. U.S. Pat. No. 6,467,725 Coles at el discloses a switched reluctance generator geared to a "windmilling" turbine engine spool to produce emergency power. U.S. Pat. No. 5,327,069 to Radun et al, U.S. Pat. No. 5,606,247 to Sutrina, and U.S. Pat. No. 6,724,114 to Horst disclose typical embodiments of switched reluctance generators and motors that use multi-pole stators and cogged-teeth rotors. None of these disclosed or suggested turbine-alternator rotor/stator vanes providing variable reluctance electromagnetic circuits for powering radiative arrays.

U.S. Pat. No. 5,544,484 to Voss et al discloses a combined turbine-alternator that includes stator blades with magnetic cores. Induction coils wound on or around the stator blades generate electrical power. Moving permanent magnets attached to a magnetic rotor disk complete the magnetic circuits of the generator/alternator. Voss et al do not discuss or disclose magnetic rotor blades comprising part of a magnetic circuit carrying flux from a stationary permanent magnet or from an electromagnet (Voss et al actually teach plastic rotor blades). Voss et al primarily teaches regulation of alternator output mechanically by controlling the airflow through the turbine. Voss et al also discloses compensating for variable turbine-alternator outputs by electronically adjusting a conventional alternator co-attached to the electrical output of the turbine-alternator. However, Voss et al does not disclose or discuss directly regulating the combined turbine-alternator by electrical or electronic means.

U.S. Pat. Nos. 6,683,555, & 6,779,796 to M. A. Carlson et al each describe and teach variations of decoy deployment and retrieval systems from flying aircraft that contemplate deployment, retrieval and redeployment of a tethered decoy, over and over again responsive to detected threats in the course of military missions in appreciation of the fact of range and maneuverability penalties inherent in a tethered decoy, and the large cost penalties inherent in cutting loose (sacrificing) a deployed tethered decoy after a detected threat abates or is abated.

SUMMARY OF THE INVENTION

My invention is a self energized retrievable decoy defense system for providing effective protection to commercial transport aircraft against terrorist threats inherent to MAN-PAD schemes of man portable heat-seeking missile attacks. It is reusable for an unlimited number of times, has no consumables, hazardous or otherwise and presents low initial and lifetime costs. The invented system is self-activating upon deployment and minimizes the probability of a successful kill of protected aircraft. The mere presence of the invented system in transport aircraft also effectively dissuades attacks on protected aircraft The invented system basically comprises one or more potentially sacrificial, self-powered, annular decoys tethered to and deployable behind a flying transport aircraft that extract energy from airflow through the annular decoy converting it into electrical power for energizing (lighting) infrared (IR) emitter arrays unfurled from around the deployed decoy to provide a large infrared (IR) radiation signature.

Once deployed, the annular decoy of the invented system extracts energy directly from the air-stream alongside or behind a flying host aircraft to which it is tethered using an integral, lightweight, high-speed turbine alternator/generator that converts airflow into and through the annular body of the decoy into electrical power.

To explain, about 30 kilowatts 'drag' power is dissipated upon stopping a 15-in. diameter, 150-KIAS (Knots Indicated Air Speed) air stream completely. (Typically, landing approach speeds of transport aircraft are greater than 150 KIAS.) In fact, one of the advantages of the invented system is that drag power extractable from airflow increases with aircraft speed thus a deployed decoy of the invented system generates and radiates more flux when the host aircraft engines are hotter and working harder.

Novel features of the invented system include an efficient turbine electrical power generator/alternator that extracts a significant fraction of the energy inherent in the airflow through the annular plenum decoy body. This generated electrical power is then converted to IR radiation using simple heater coils (or other means) and radiated copiously at fluxes on the order of 1000 s of watts/steradian for swamping IR signatures of the engines of transport aircraft and attracting any launched man portable heat-seeking missiles.

In particular, a 90% emissive Lambertian gray body at 1050 K radiates at about 2 watts per $cm^2$ per steradian peaked near 2.8 micrometers wavelength with about 40% radiated between 2.8 and 5 micrometers, which is the sensing bandwidth for most of today's heat seeking MAN-PADS missile systems. A heater area of 3000 $cm^2$ (about 450 square inches) continuously radiating at 1050 K emits a flux of about 1500 watts/steradian in the 2.8–5 micrometer band and requires an electrical power source capable of continuously providing in excess of 4000 watts.

Thus, an aspect of the invented system contemplates routine deployment of tethered decoy(s) radiating at sufficiently intensities when transport aircraft are most vulnerable to launched man portable heat-seeking missiles, i.e., when the aircraft is moving relatively slowly at low elevations during takeoff and landing approaches, so that sensors of such missiles, if present, will lock onto a radiating decoy rather than the host aircraft before they are actually launched.

Although a deployed, intensely radiating decoy, because it is tiny with respect to the host aircraft, may cause an attacking missile to miss both the aircraft and the decoy itself completely, in many cases, it is desirable to also eliminate the missile entirely by sacrificing the decoy. Accordingly, the invented system contemplates optional deployment of web like structures from the tethered, radiating decoy effectively increasing its interception cross-section and thus the likelihood of triggering contact and/or proximity (radio) fusing exploding the attacking missile.

Still other aspects of the invented system relate to "petal" structures carrying IR radiator arrays that fold or furl around the exterior of the annular decoy to form a smaller cross-section, preferably streamlined aerodynamic body when retracted into and anchored in a housing on or within the host aircraft thus minimizing drag and fuel penalties when the aircraft is cruising at higher, less vulnerable altitudes. The folding "petal" structures are biased to unfurl when the decoy is deployed to provide the large requisite IR radiating area.

With the invented system, one or more decoys would be deployed as the host aircraft ascends at liftoff and/or descends on landing approach after the aircraft below a certain AGL (Above Ground Level). The decoy(s) would be retrieved when the host aircraft reaches and descends below a predetermined safe altitude on final approach. Decoy deployment and retrieval may also be automatically correlated with landing gear and flap settings.

The invented passive decoy system also contemplates decoys scaled to the size of the host aircraft defended. Regional jet transports with smaller engines that radiate less IR can be defended with smaller decoys having less overall drag producing comparably smaller swamping IR radiation flux/intensities.

The invented system preferably includes an integrated turbine-alternator assembly employing turbine stator and rotor vanes and spokes partly or wholly composed of high magnetic-permeabilty materials, a permanent magnet (or an electromagnet) for providing a plurality of magnetic circuits. Rapid gap changes between stationary stator vanes and spinning rotor vanes driven by airflow through the annular throat of the decoy body rapidly varies magnetic flux in each circuit inducing significant electric currents and related voltages in small, lightweight induction coils wound around stator spokes. The generated electrical currents in the induction coils are electrically coupled for driving (lighting) heater coils or other IR-emitter arrays mounted on the unfurled "petal" structures of the decoy.

Objects and Advantages

The objects and advantages of the present invention are:
(a) to effectively protect civilian transport aircraft against surreptitious terrorist attacks;
(b) to deter attacks against civilian transport aircraft;
(c) to provide a cost-effective system for continuously defending passenger aircraft against heat-seeking missile attack;
(d) to provide a compact and lightweight system for continuously defending transport aircraft against heat-seeking missile attack;
(e) to provide a long-term system for defending transport aircraft against heat-seeking missile attack;
(f) to provide a system with low initial cost for defending transport aircraft against heat-seeking missile attack;
(g) to provide an easily implemented, low cost retro-fit system for defending existing transport aircraft against missile attack;
(h) to provide a system for defending transport aircraft against heat-seeking missile attack that minimizes hazards to people and structures on the ground;
(i) to provide a system for defending transport aircraft against heat-seeking missile attack that requires no consumables;
(j) to provide a system that eliminates hazardous ground replenishment operations for defending transport aircraft against heat-seeking missile attack;
(k) to provide a system that requires no refueling operations for defending transport aircraft against heat-seeking missile attack;
(l) to provide a tethered decoy system for defending transport aircraft against heat-seeking missile attack that radiates IR energy fluxes sufficient to overwhelm or swamp IR signatures of transport aircraft that decoys attracts and explodes attacking, heat-seeking missiles;
(m) to provide an air stream generated, electrically powered, tethered decoy system capable of continuously radiating IR energy fluxes necessary for defending transport aircraft against heat-seeking missile attacks;
(n) to provide a decoy system for defending transport aircraft against heat-seeking missile attacks deployed on a passive tether line that neither conducts power nor imparts signals to the decoy;
(o) to provide a system that deploys as transport aircraft ascends on takeoff for defending against heat-seeking missile attacks;
(p) to provide a system that deploys as transport aircraft approaches before and while landing for defending against heat-seeking missile attack; and
(q) to provide a tethered decoy system for defending transport aircraft against heat-seeking missile attack that can be repeatedly, easily deployed, retrieved, compactly folded and stowed thus eliminating parasitic drag during normal high-altitude flight and precluding destructive ground surface contact during takeoffs and landings.

Still further objects and advantages will become apparent from a consideration of the ensuing description and accompanying drawings.

DRAWING FIGURES

FIG. 1. is an overhead view showing towed decoys behind a transport aircraft.

Figure 7A:
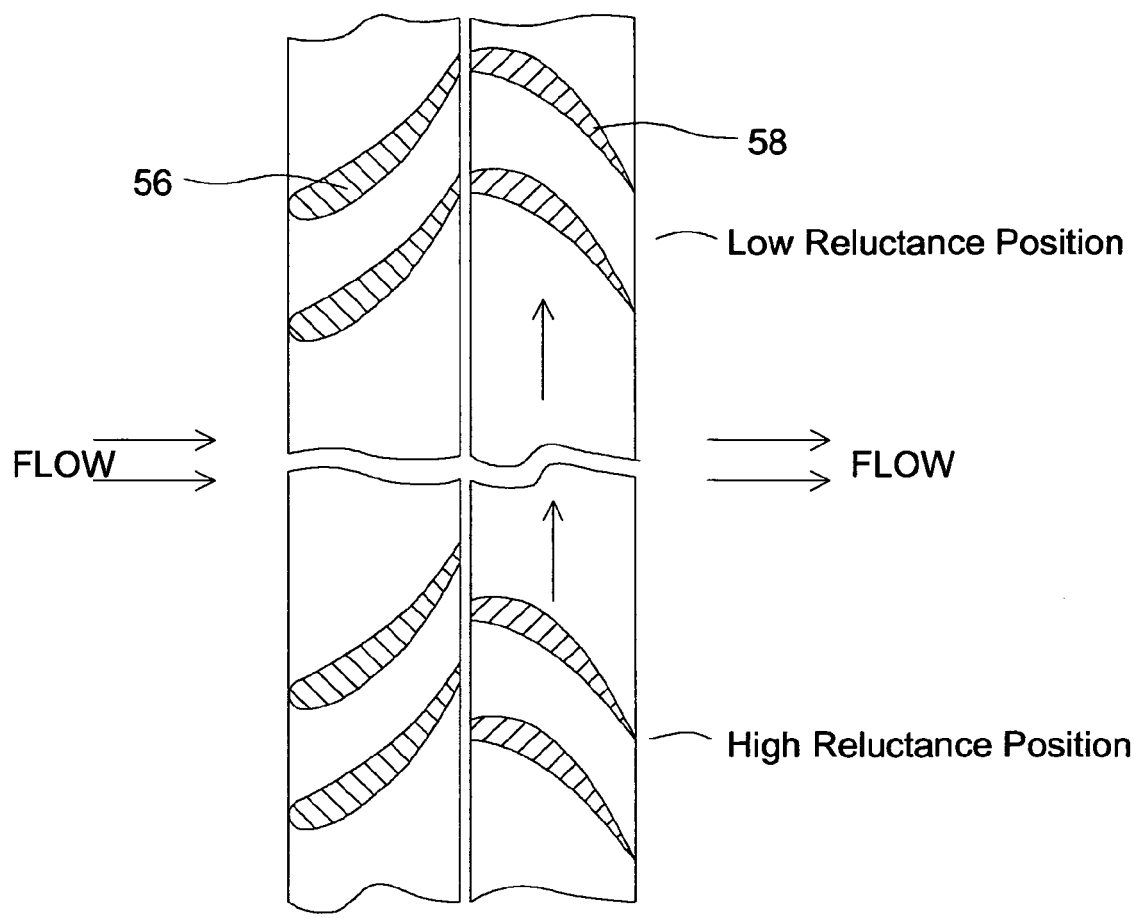
FIG. 7A illustrates the positions of rotor and stator vanes in high and low reluctance juxtapositions.
Figure 7B:
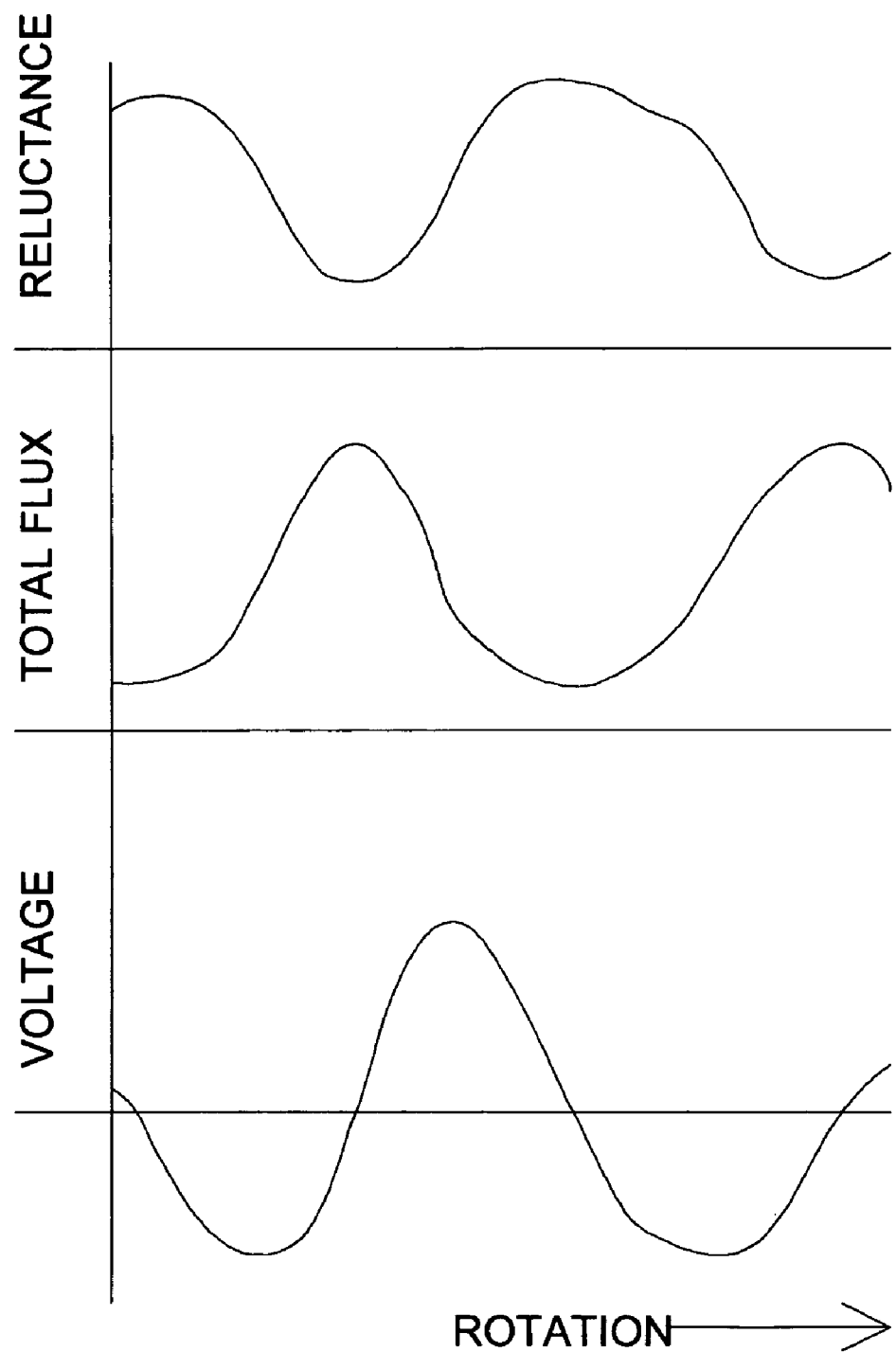

FIG. 7B plots the reluctance, total magnetic flux, and generated voltage versus turbine rotation.

Figure 8:
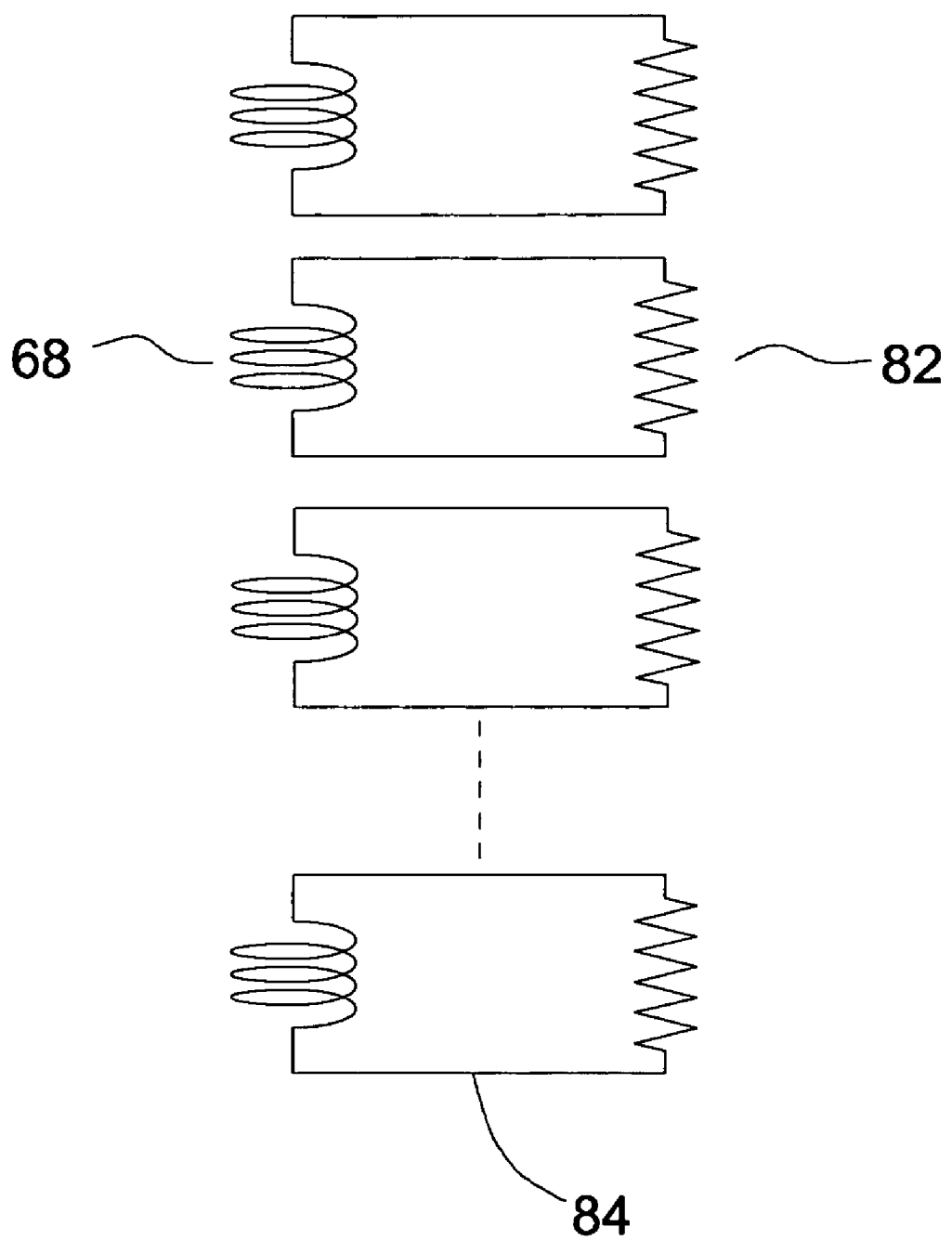

FIG. 8 is a wiring diagram showing individual connections between alternator induction coils and IR heater elements.

REFERENCE NUMERALS IN DRAWINGS

| | | | |
|---|---|---|---|
| 10 | transport aircraft | 12 | missile |
| 14A–D | decoy | 16A–B | pod |
| 18 | (A–C) tether lines | 19 | inner wall decoy housing |
| 20 | swivel | 22 | intake nozzle cone |
| 24 | turbine stator | 25 | annular airflow nozzle |
| 26 | decoy housing | 27 | IR radiation |
| 28 | turbine rotor | 30 | alternator |
| 32 | IR radiator petals | 33 | inlet airflow |
| 34 | outlet orifice | 35 | exhaust airflow |
| 36 | pod housing | 38 | wing |
| 40 | pylon | 41 | deploying/reeling/stowing mechanisms |
| 42 | IR radiator petals | 44 | tail cone |
| 46 | impact web | 48 | magnetic pole piece |
| 49 | port | 52 | controller |
| 54 | steering vanes | 56 | stator vane |
| 58 | rotor vane | 60 | gap |
| 62 | stator spoke | 64 | stator hub |
| 68 | induction coil | 70 | permanent magnet |
| 74 | rotor spoke | 76 | rotor hub |
| 78 | rotor bearing | 80 | ferrofluid lubricant |

DESCRIPTION—PREFERRED EMBODIMENT

Figure 1:
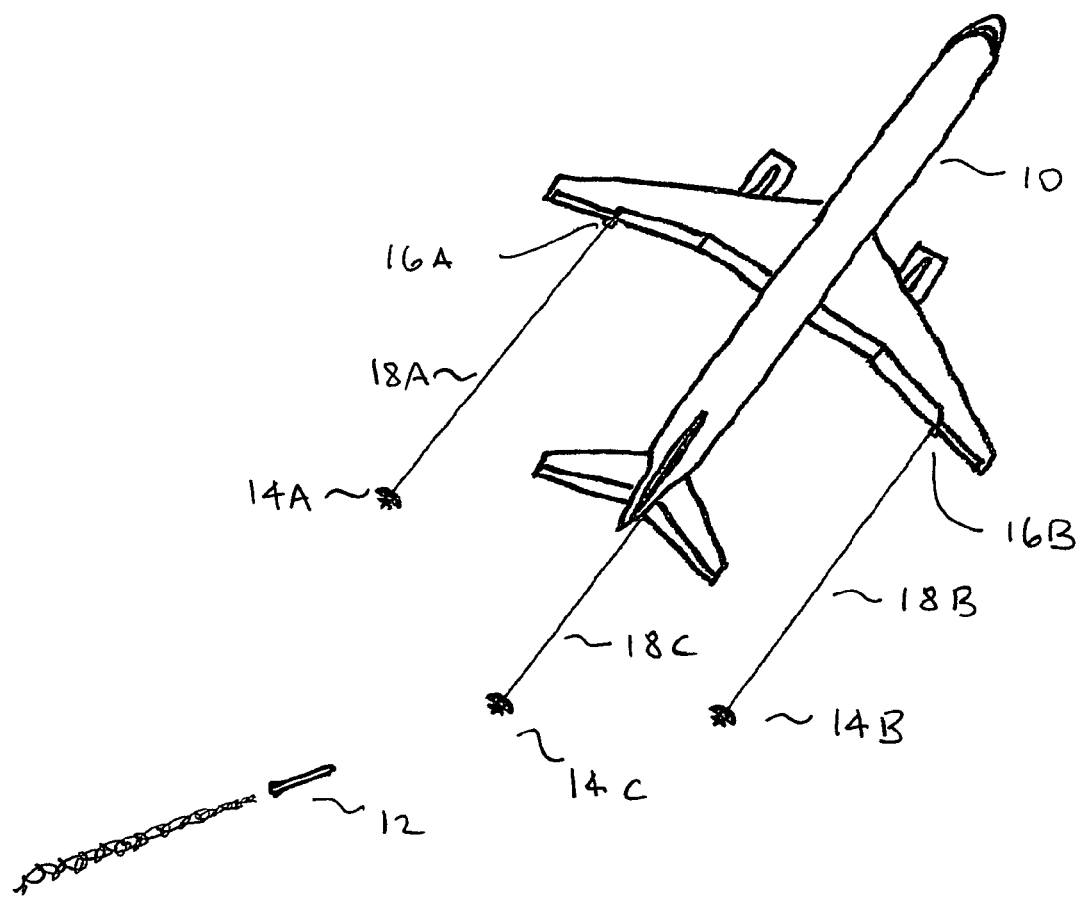

FIG. 1 depicts several decoys 14A–C deployed from various locations on a transport aircraft 10. Decoys 14A–C are stowed in under wing and fuselage housing pods 16A–C during ground and high-altitude operations. The housing pods contain deployment and retrieval mechanisms for ejecting, reeling out, reeling in, and stowing decoys 14A–C tethered on lines 18A–C. [See U.S. Pat. Nos. 6,683,555, & 6,779,796 to M. A. Carlson et al.] Decoy 14C is towed by tether 18C passing from a fuselage pod (not shown) located at the aft, in or on the aircraft 10. Other possible locations for the decoy housing pods 16, include wingtips and the tips of the horizontal and vertical stabilizers. A heat-seeking missile 12 is depicted as being drawn to decoy 14C. Decoy 14C (or any other decoy) may be sacrificed to missile 12. One or more decoys can be employed per transport aircraft.

Figure 2:
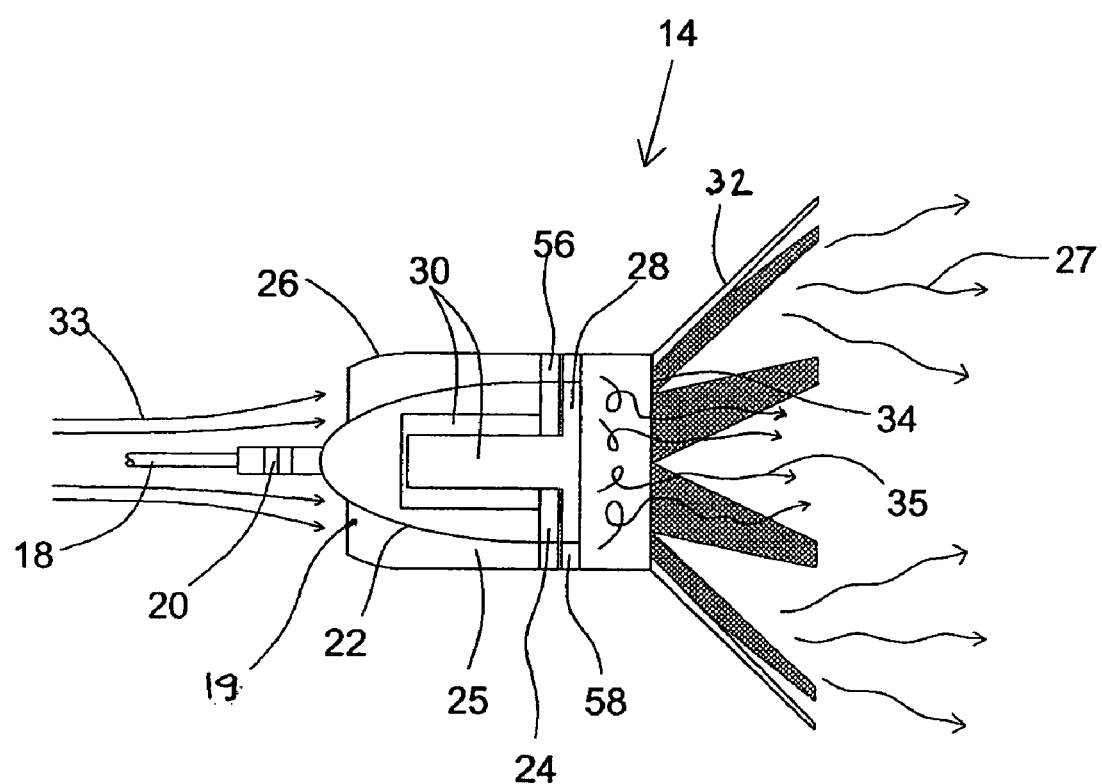
FIG. 2 shows a cross section of the basic elements of the preferred decoy.

FIG. 2 schematically shows a cross section of the essential components of an embodiment of a self-powered sacrificial tethered decoy 14, preferred for the invented system, namely:

a substantially annular decoy housing 26;

an intake nozzle cone 22 mounted centrally with the annular decoy housing 26 defining an accelerating, annular airflow nozzle 25;

an integrated turbine-alternator 30 for generating electrical currents including an alternator stator structure 24 mounted coaxially within the annular decoy housing 26 presenting multiple stationary vanes 56 deflecting and directing, accelerated airflow from the annular nozzle 25 into an alternator rotor structure 28 mounted for spinning coaxially within the decoy housing 26 presenting multiple vanes 58 intercepting accelerated airflow deflected and directed by the stator vanes 56 (See FIG. 7A);

a plurality folding infrared (IR) emitter petals 32 unfurled from around and coupled to the periphery of the decoy housing 26; and an optional swivel 20 at the nose of the intake nozzle cone coupling to the tether 18 reeling in and out from a decoy pod housing 16.

Optional swivel 20 permits decoy 14 to rotate independently without twisting up the tether 18.

Figure 6:
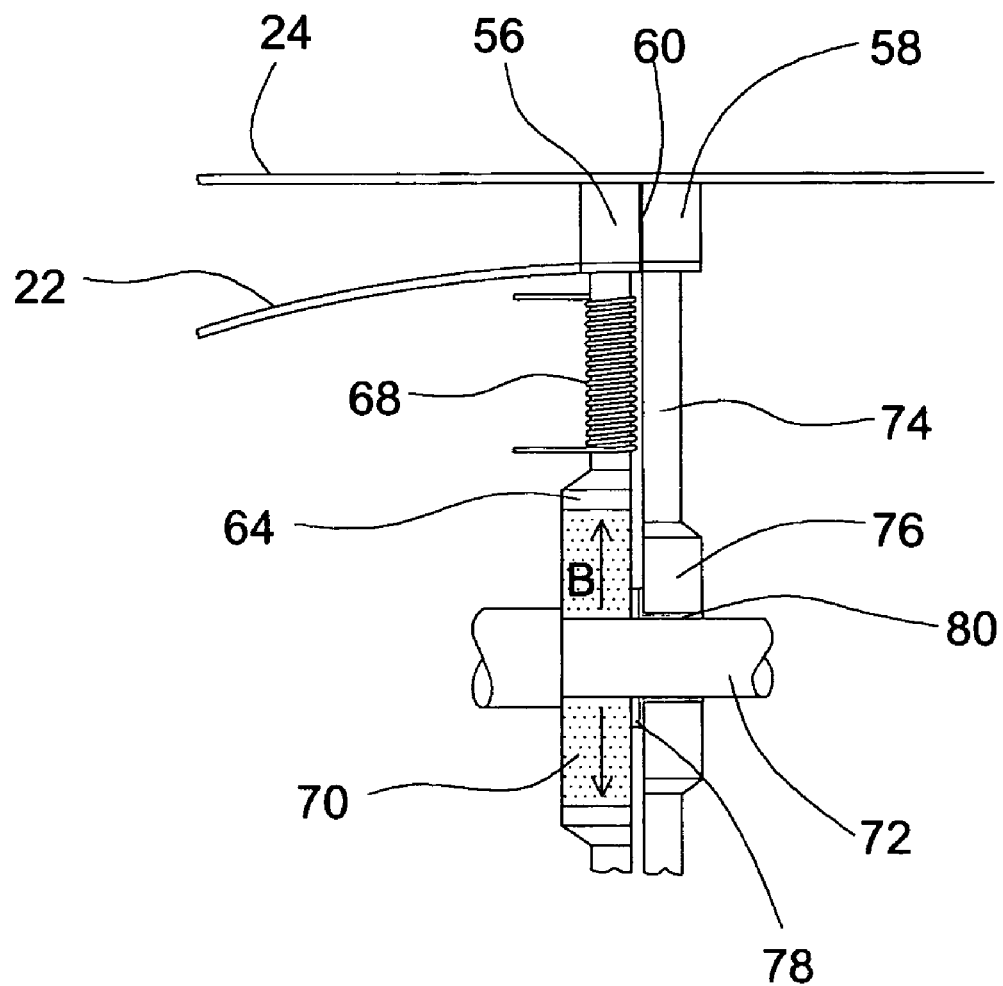
FIG. 6 is a partially cut-away view of an integrated turbine and variable-reluctance alternator.

Inlet air 33 streams into and is accelerated by the converging annular intake nozzle 25 of decoy 26 defined the between nozzle cone 22 and the inner wall 19 of the annular decoy housing 26. Stator vanes 56 of the integrated turbine-alternator 30 deflect the accelerated airflow into the multiple vanes 58 of the alternator rotor 28 structure, causing it to spin at a very high rpm generating substantial alternating electrical (AC) currents in coil windings wound around stator spokes 62 (FIG. 6.) corresponding to magnetic flux variations induced by the spinning alternator rotor structure 28. Alternatively the integrated turbine-alternator 30 can include multiple stages with successive turbine stators 24 and rotor 28 disks. Exhaust airflow 35 flows from outlet end 34 of the decoy housing 26.

The plurality of folding infrared (IR) emitter petals 32, unfurled, present a substantially annular rear surface that radiates IR energy 27 primarily rearwards from the decoy. The preferred infrared IR emitter petals 32 mount a structural array of glass-encapsulated resistance heaters (not shown) that when electrically heated by alternating currents generated by the integrated turbine-alternator 30 approximate radiation emitted from a 600 K or hotter blackbody. Alternatively, the infrared IR emitter petals 32 could present a structural array of bare resistive heaters, electric arcs or gas discharges, radiation emitting diodes, or lasers. The surfaces of the petals 32 could also be treated to enhance IR emissivity in the 3–5 micron band.

Figure 3A:
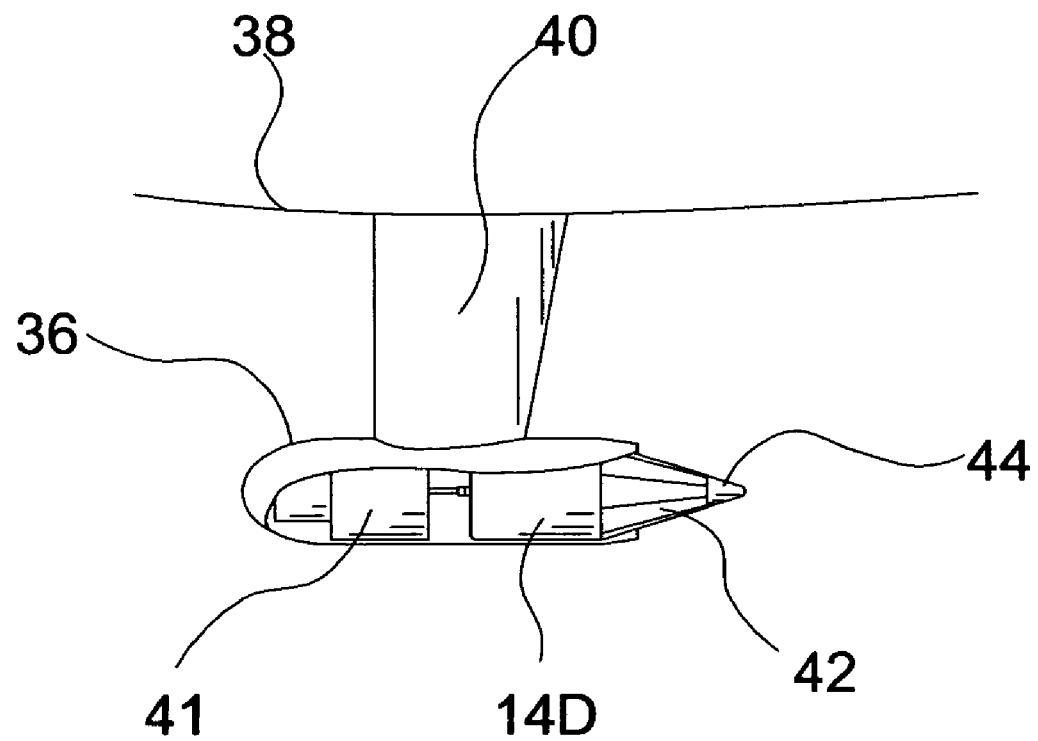
FIG. 3A is a partially cut-away view of the decoy stowed in an underwing pod.
Figure 3B:
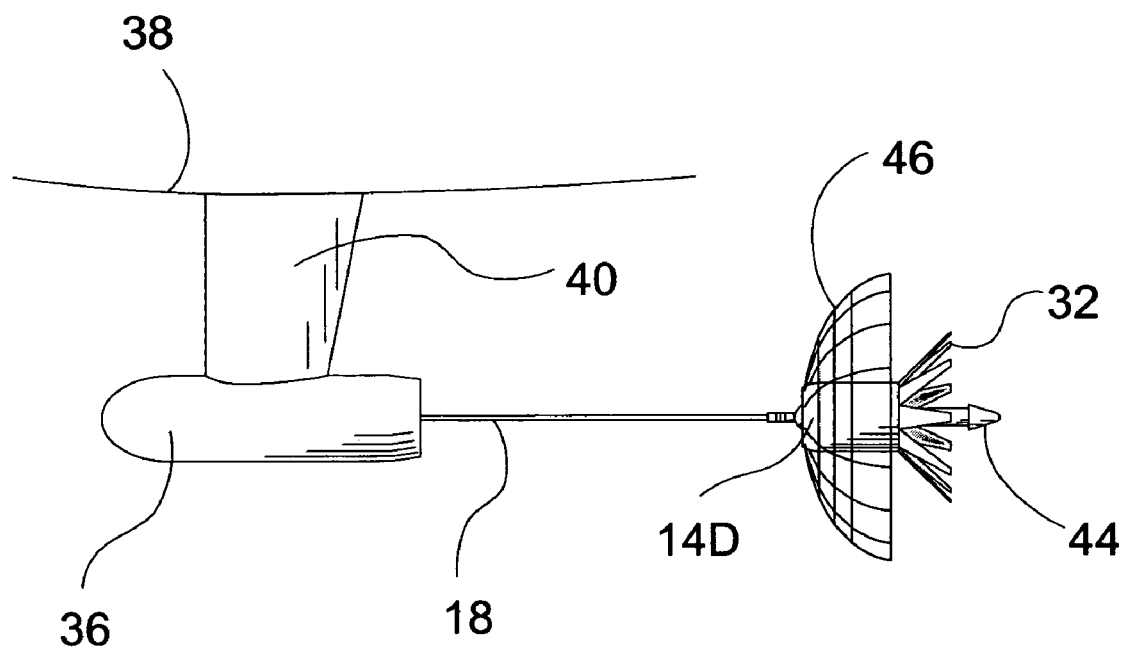
FIG. 3B depicts an IR decoy deployed from an underwing pod.
Figure 3C:
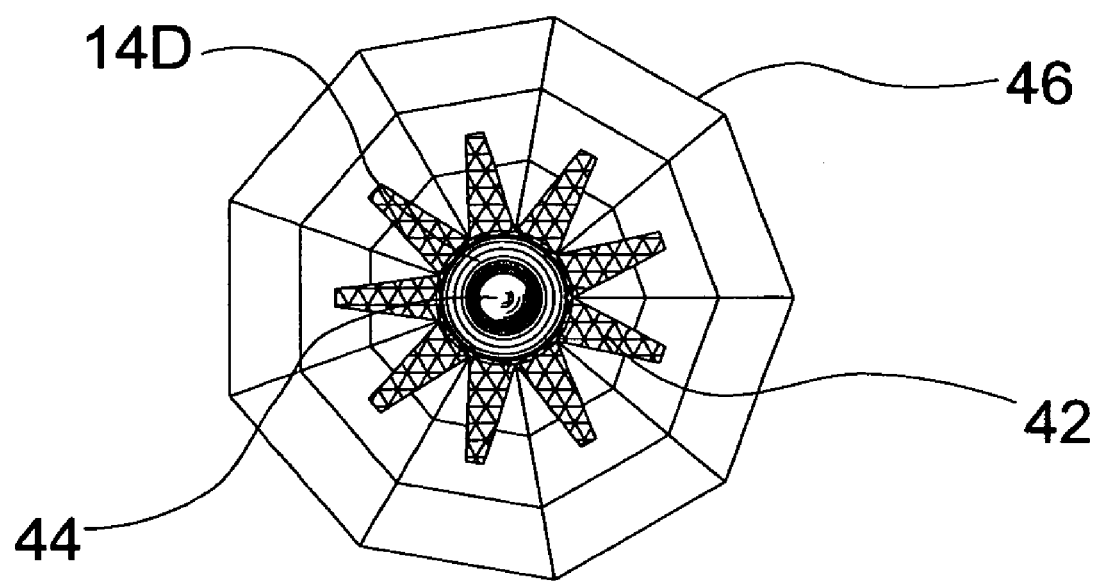
FIG. 3C is a rear view of a deployed IR decoy.

Looking now at FIGS. 3A–C, decoy 14D is respectively stowed in (FIG. 3A) and deployed from (FIG. 3B) housing pod 36 shown attached to the underside of wing 38 by means of pylon 40. A similar pod-and-pylon arrangement (not shown) may be attached to the fuselage of transport aircraft 10. Elements of pod 36 may alternatively be enclosed within the tapered aft section of the fuselage of transport aircraft 10. Pod 36 contains a tether reeling mechanism 41, and mechanisms for mechanically ejecting and stowing the tether decoy 14D from and into the housing pod 36. In the event decoy 14D needs to be jettisoned after sustaining damaged on deployment, the pod house should also include mechanisms for cutting tether 18.

The skilled designer should appreciate the invented system contemplates routine and repeated deployment and retrieval of decoys during takeoffs and landing approaches. Accordingly the rate of decoy deployment and retrieval is not as an important as is durability and reliability of the deployment and retrieval mechanisms In addition to deployable IR emitter petals 32 and, decoy 14D could also include a deployable impact web 46 that unfurls either upon deployment or responsive to radio signal command from the host aircraft. The impact web 46 ideally could provide a swamping radar reflection/scattering signals for increasing the probability of activating impact and any radio proximity fusing causing an approaching missile 12 to explode. IR-emitter petals 32 and impact web 46 are both spring-biased to open automatically when decoy 14D is released from its pod 36. Optionally, IR-emitter petals 32 and/or web 46 could be unfurled by electromechanical means, such as electrical motors after ejection from the pod 36 during deployment. On retrieval, as the decoy 14D is stowed by the stowing mechanism into it pod 36, the deployment portal 45 of the pod 36 folds the IR-emitter petals 32 down around decoy 14D to form a streamlined tail in conjunction with an optional tail cone 44. The configuration of a decoy 14 with folded IR-emitter petals preferably is streamlined to minimize drag when stowed in its pod 36. Optional tail cone 44 may also serve as a reflector reflecting radiated IR from the petals in the forward direction for decoying missiles approaching the host aircraft head-on. Like the IR-emitter petals 32, the IR reflecting surfaces of tail cone 44 preferably are treated to enhance IR reflections in bands employed by heat seeking missiles designed to sense jet plume radiation.

Looking at FIG. 3C, the rear facing surfaces of the unfurled IR-emitter petals 32 of decoy 14D significantly increase area available on the decoy for IR radiance and hence the radiometric intensity or flux that can be emanated from the decoy. The IR flux radiance of decoy 14D can be further increased by optionally adding rows of IR-emitter petals 32 (not shown), each carrying arrays of IR-emitters electrically coupled to be energized by electrical currents generated by the integrated turbine-alternator 30 within the central plenum of the decoy. Such additional rows of IR-emitter petals 32 would fold or furl successively down around the periphery of the decoy housing 26 each row inside the next upstream row of petals 32 as the decoy is inserted back into its pod 36 by stowing mechanisms.

Preferably, the IR-emitter petals 32 are aerodynamically shaped, such that when unfurled parasitic airflow drag is minimized and the arrays of IR-emitters mounted on the rear facing surfaces of the petals 32 are shielded from excessive convective cooling by the air stream. IR-emitter Petals 32 and impact web 46 also serve to greatly increase the radar reflectivity of decoy 14D thus increasing likelihood of decoying radar sensing missiles and as well, triggering any radio proximity fuses in the missile 12 causing it to explode.

Figure 4:
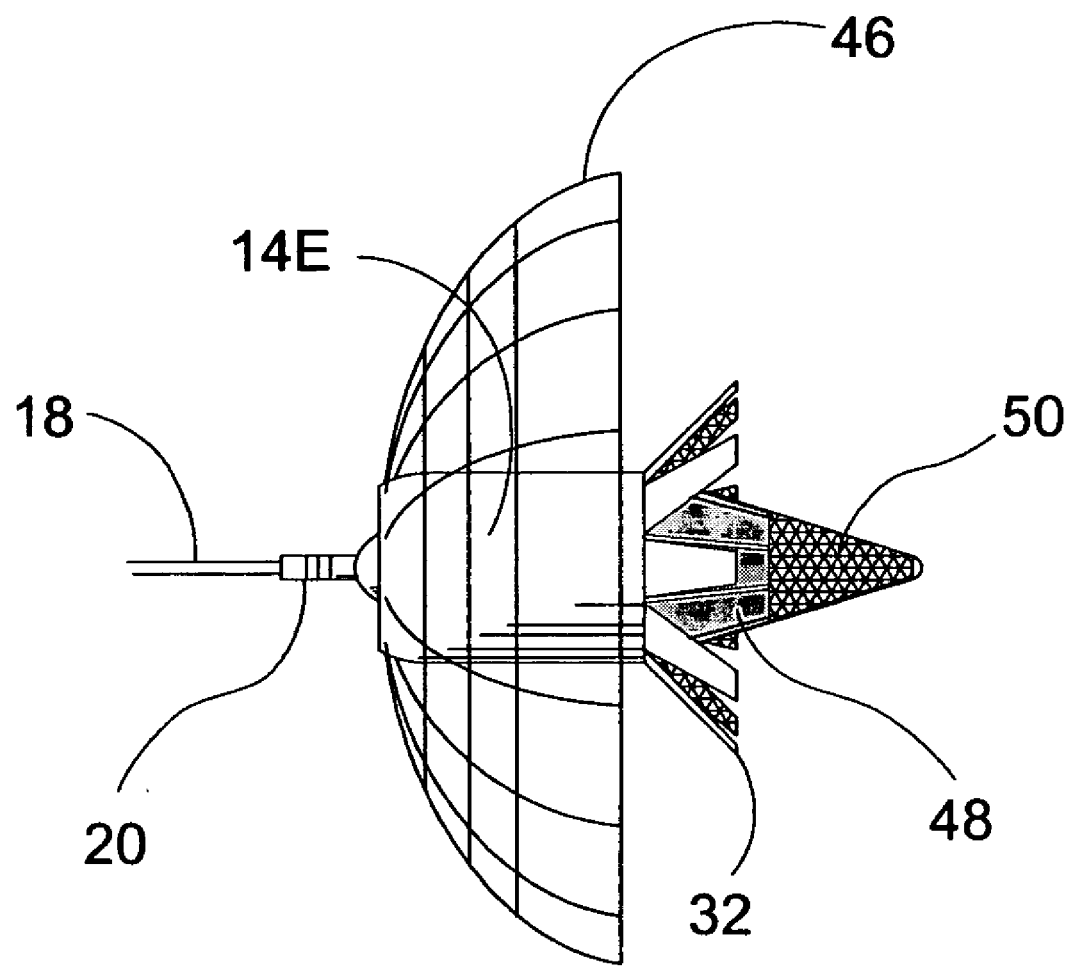
FIG. 4 is a side view of an alternative IR decoy with exhaust slots having an IR radiating tail cone.

FIG. 4 illustrates an alternative decoy embodiment 14E where an IR-emitter array 50 is also mounted on and/or radiating out from the tail cone surface. In this embodiment, outlet airflow 35 from the integrated turbine-alternator within the central plenum of the decoy housing 26 exhausts via slots 48. A large IR radiating area is obtained by covering all or most of the tail cone surface with IR radiating elements. In a further option, unfurlable IR radiating petals are combined with an active IR radiating tail cone to further increase the IR radiating surface.

The swivel coupling 20 between the decoy 14 and the tether 18 to the host aircraft 10 preferably allows the tether 18 and decoy 14 to rotate independently, i.e., precludes rotation of the decoy 14 from twisting up the tether line 18 and, visa versa, precludes twisting of the tether line 18 from rotating the decoy 14. If necessary, various passive measures (such as fixed vanes) may be employed to offset induced torques tending to rotate the decoy 14 about its longitudinal (turbine-alternator) axis.

Figure 5:
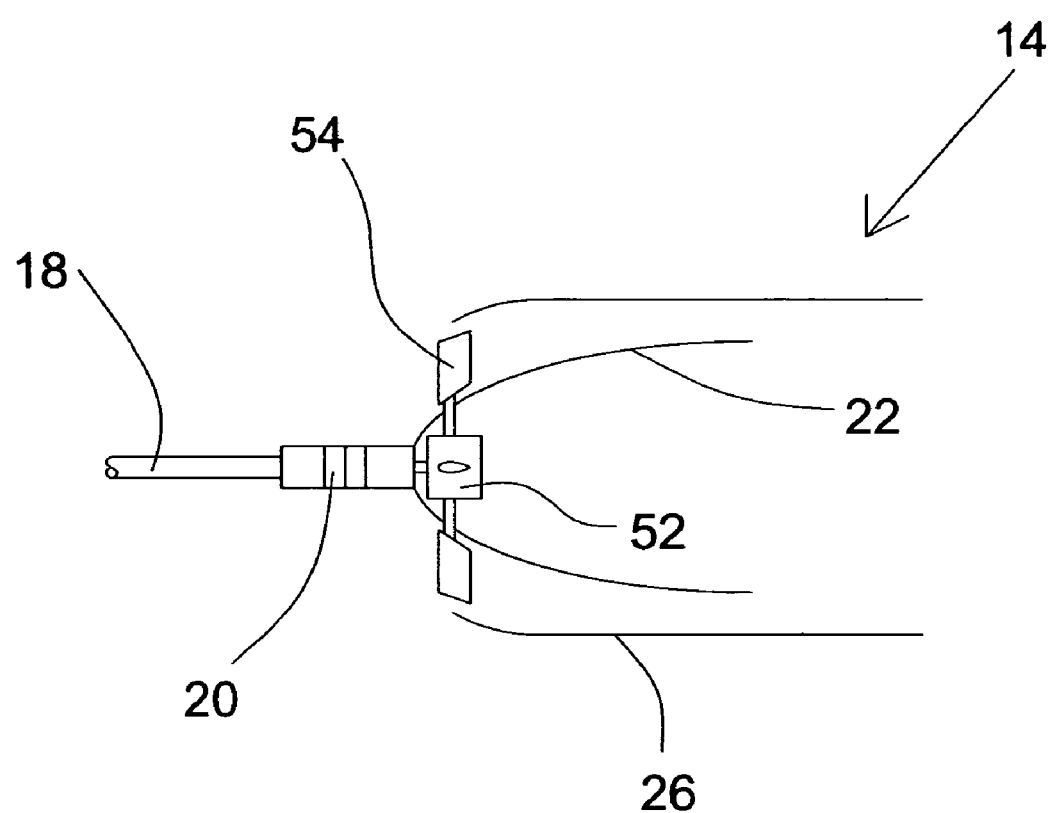
FIG. 5 is a partially cut-away view of an anti-rotation system.

Alternatively, as diagramed in FIG. 5 an active steering system for eliminating any residual relative rotation between tether 18 and decoy 14 could include a controller 52 connected on the decoy side of swivel 20 for sensing relative rotation between the swiveling components and orienting turning two or more small steering vanes 54 for appropriately zeroing out relative rotation. As shown steering vanes 54 protrude from the intake nozzle cone 22, into the annular airflow nozzle 25 but as well, could be located as protruding into the passing air stream from either the interior or even the exterior surfaces of the annular decoy housing 26. For rotational control steering vanes 54 preferably turn together.

Also such active steering system could be employed to control the drag position of the decoy 14 relative to the host aircraft 10 (up, down left or right) by differentially turning steering vanes 54 responsive, for example, to host aircraft radio signals [See description of the TMX and TRX-12 Manoeuvring Aerial Tow Target manufactured by Meggitt Defense Systems of Tustin California] or by passing control signals from the aircraft to the decoy along the tether by means of an attached or embedded electrical cable or fiber optic means. Such active steering control may also be desirable to preclude and/or control instabilities and oscillations.

The preferred source of electrical power for energizing (lighting) the IR-emitter arrays is a lightweight, turbine—alternator integrated into a compact unit forming a structural core centrally within the annular decoy housing 26. (The term "alternator" is used to denote any form of AC or DC electrical power generation.) As indicated by the partial, cutaway cross-section diagram of FIG. 6, the essential features of the contemplated integrated variable reluctance turbine-alternator unit include both the stator vanes 56 and rotor vanes 58 composed of high-magnetic-permeability materials, separated by a narrow air gap 60. The stator and rotor vanes 56 and 58 could be formed with laminates of magnetic materials or ferrites that suppress eddy currents and concomitant power losses. Other possibilities include stator and rotor vanes 56 and 58 containing cores comprising such magnetic materials. Stator vane 56 terminates a stator spoke 62 that in turn extends from a stator hub 64. Stator spoke 62 and stator hub 64 are also composed of high-magnetic-permeability materials. Multiple stator spokes 62 and stator vanes 56 extend from the stator hub 64. Induction coils 68 are wound around each stator spoke 62. The stator spokes 62 are preferably oval, elliptical, oblong, or substantially rectangular in cross-section and are angled with respect to the axis of hub 64. Angling the long cross section axis of spoke 62 permits an increase in spoke cross-sectional area and a corresponding decrease in magnetic reluctance. An induction coil 68 is wound around each stator spoke 62 for generating electrically currents and corresponding voltages responsive to variations of magnetic flux within the spokes per Lenz's law.

A permanent annular ring magnet 70 is mounted between stator hub 64 and shaft 72. Shaft 72 is also composed of a high-magnetic-permeability material. Optionally, hub 64 and shaft 72 include magnetic materials, such as laminates or ferrites, for suppressing eddy currents. Permanent magnet 70 is magnetized radially, i.e., with one pole of the magnetic field at its inner annular periphery and the other pole at its outer annular periphery, as shown.

Each rotor vane 58 terminates a rotor spoke 74 that extends from a rotor hub 76. As with the stator spokes 62, rotor spokes 74 are preferably elongated and angled with respect to the axis of hub 76. Rotor spokes 74 and rotor hub 76 are also composed of high-magnetic-permeability materials. Multiple rotor spokes 74 and rotor vanes 58 extend from the rotor hub 76. Rotor hub 76 is supported by bearing 78 and rotates substantially freely around shaft 72. Optionally, ferrofluid 80 fills the gap between rotor hub 76 and shaft 72, producing a low-reluctance and low-friction magnetic path between hub 76 and shaft 72.

Magnet 70, hubs 64 and 76, spokes 62 and 74, vanes 56 and 58, and gaps 60 form a plurality of parallel variable reluctance electro-magnetic circuits wherein each combination of stator vane 56, stator spoke 62, and induction coil 68 wound around the spoke 62 effectively form one pole of a multi-pole alternator. The Induction coils 68 may have relatively few turns due to the high RPM of the spinning rotor structure and consequent rapid induced magnetic flux changes.

Permanent magnet shapes other than annular ring 70 may be employed. Also, permanent magnet 70 could be replaced with an electromagnet (not shown). In this latter instance, a second, DC electric generator (not shown) mechanically coupled to and driven by the alternator rotor structure 28 may be used to power an alternator electromagnet. The electrical power output of the integrated turbine-alternator could then be conveniently controlled by varying the excitation current to said electromagnet thereby allowing control/regulation of the IR radiation emission intensity responsive to different flight and atmospheric conditions. For example, at high aircraft speeds the electrical power output of the integrated turbine-alternator could be modulated to prevent over-driving the IR emitters. The skilled designer should appreciate that as airflow velocity increases more energy is extracted by contemplated turbine-alternator. Care should be taken to not exceed the limits of the electrical energy distribution network and the so energized IR emitter arrays.

Magnet 70 produces a variable flux $\Phi$ within each magnetic circuit, whose strength depends on the relative positions of stator vanes 56 and rotor vanes 58. FIG. 7A presents end-on views of the rotor and stator vanes when they are closest (low reluctance) and furthest apart (high reluctance). The trailing edges of stator vanes 56 and the leading edges of rotor vanes 58 may be flattened as shown in FIG. 7A to decrease the reluctance of gap 60 when the stator and rotor vanes are adjacent one another. According to Lenz's Law, the voltage induced in an N-turn coil through which the magnetic circuit passes is $E=-Nd\Phi/dt$. FIG. 7B plots the total flux through each stator spoke versus turbine rotation angle and the induced voltage. If the number of stator vanes 56 and rotor vanes 58 are equal to one another, the number of voltage impulses are produced per rotor rotation will equal the number of vanes. Optionally, the number of rotor vanes 58 can be different from the number of stator vanes. This provides the advantage of reducing vibration. Because turbine rotor 28 will have a relatively rapid rotation rate, large induced voltages (and currents) are generated with relatively small permanent or electromagnets, a relatively small number of turns, relatively small magnetic circuit elements, and, therefore, a lightweight, efficient alternator.

FIG. 8 is the wiring diagram of the preferred embodiment showing each of a plurality of induction coils 68 individually connected to IR heater elements 82. This minimizes undesirable interactions between alternator poles. Current return paths 84 optionally may be connected together to form a common electrical return path. Other combinations of series and parallel paths may be used alternatively. Structural parts of the decoy may serve to provide the electrical return path. Because the current impulses have relatively high frequency content, transmission-line design techniques are optionally employed whereby the connecting lines between induction coils 68 and heater elements 82 are matched in impedance to elements 82 to minimize any adverse effects due to electrical wave reflections.

CONCLUSIONS, RAMIFICATIONS, AND SCOPE

Accordingly, it can be seen that I have provided a method and apparatus for economically defending transport aircraft against heat-seeking missile attack.

Although the description above contains many specificities, these should not be construed as limiting the scope of the invention but as merely providing illustrations of some of the presently preferred embodiments of this invention. Various other embodiments and ramifications are possible within its scope.

Thus the scope of the invention should be determined by the appended claims and their equivalents, rather than by the examples given.

I claim:

1. A deployable and retrievable decoy system for protecting passenger/transport aircraft against man portable, heat seeking missiles, comprising in combination,
    a) a decoy housing integrated with the aircraft having an aft deployment port;
    b) a decoy structure stowable within and deployable from the decoy housing via its aft deployment port, the decoy structure including,
        (i) an annular casing with an inner cylindrical core defining an annular airflow plenum having an upstream end and a downstream end;
        (ii) normally unfurled radiator petals pivotally secured coaxially around the annular casing of the decoy biased for an unfurled position opening outward from the annular casing, each radiator petal structurally supporting and presenting an array of infrared radiation emitters;
        (iii) a turbine-alternator means in the cylindrical core of the decoy receiving and converting air streaming through the annular airflow plenum into electrical current for electrically exciting, energizing the arrays of infrared radiation emitters presented by the radiator petals to radiate infrared radiation at peak wavelengths less than 5 microns; and
        (iv) a tether coupler; and
    c) a decoy deployment and retrieval mechanism including a tether connecting between the decoy housing and the tether coupler of the decoy structure for deploying, then retrieving and stowing the decoy structure back into the decoy housing, the normally unfurled radiator petals pivoting and furling around the outer annular casing of the decoy structure when stowed within the decoy housing.

2. The deployable and retrievable decoy system for protecting passenger/transport aircraft of claim 1 wherein the turbine-alternator means includes,
    (a) a high-magnetic-permeability stator element structurally integrated with the inner cylindrical core of the decoy structure presenting multiple stationary stator vanes for deflecting and directing airflow through the annular airflow plenum, at least one stator vane providing a separate, low reluctance magnetic flux path,
    (b) a high-magnetic-permeability rotor element mounted for spinning within the annular casing of the decoy structure presenting multiple rotor vanes intercepting airflow deflected and directed by the stator vanes, the intercepted airflow spinning the alternator rotor element with respect to the alternator stator element, at least one rotor vane providing a separate, low reluctance magnetic flux path;
    (c) a magnetic field source establishing a magnetic flux in the high magnetic-permeable stator and rotor elements crossing between the stationary stator vanes and the spinning rotor vanes; and
    (d) induction coils encircling low reluctance magnetic flux paths through the high-magnetic permeability stator element,
    (e) electrical energy distribution means coupling between the induction coils and the infrared radiation emitters arrayed on the respective radiator petals for conducting electrical currents generated in the induction coils by variations of magnetic flux in the encircled magnetic flux paths through the high-magnetic permeability stator element induced by the spinning rotor vanes for exciting and energizing the infrared emitters to radiate the infrared radiation.

3. The deployable and retrievable decoy system for protecting passenger/transport aircraft of claim 1 or 2 wherein the decoy structure further includes:

(v) an intake nozzle cone coaxially positioned within the annular casing at the upstream end of the annular air flow plenum establishing in combination with the annular casing a converging annular airflow nozzle for compressing and accelerating airflow into the turbine-alternator means.

4. The deployable and retrievable decoy system for protecting passenger/transport aircraft of claim 1 wherein the decoy structure further includes:

(vi) a tail cone structure extending from the annular casing out the downstream end of the annular airflow plenum for:
  (a) supporting distal ends of furled radiator petals, and
  (b) scattering impinging infrared radiation emitted from the arrays of infrared radiation emitters presented by the unfurled radiator petals for decoying heat seeking missiles approaching the aircraft head on.

5. The deployable and retrievable decoy system for protecting passenger/transport aircraft of claim 3 wherein the decoy structure further includes:

(vii) a tail cone structure extending from the annular casing out the downstream end of the annular airflow plenum having a surface array of infrared radiation emitters energized by electrical power from the turbine-alternator means for decoying heat seeking missiles approaching the aircraft head on.

6. The deployable and retrievable decoy system for protecting passenger/transport aircraft of claim 1 wherein the tether coupler has a pair of swiveling components, one fastening coaxially onto the intake nozzle cone at its tip, the other fastening onto the tether connected to the decoy housing secured to the aircraft for allowing the decoy structure and the tether to independently rotate relative to each other.

7. The deployable and retrievable decoy system for protecting passenger/transport aircraft of claim 3 wherein the decoy structure further includes:

(viii) at least one steering vane protruding into streaming airflow when the decoy is deployed, and further including, e) controller means for responding to signals from the aircraft and changing the orientation of the steering vane allowing operational control of tethered positions of the deployed decoy relative to the aircraft.

8. The deployable and retrievable decoy system for protecting passenger/transport aircraft of claim 7 and further including a controller means sensing relative rotation between the pair of swiveling components of the tether coupler and moving the orientation of the steering vane responsive to the sensed rotation to counter torques rotating the decoy structure relative to the tether line.

9. The deployable and retrievable decoy system for protecting passenger/transport aircraft of claim 1 wherein the decoy structure further includes:

(ix) an impact web unfurling radially outward from around the annular casing of the decoy structure for presenting a large proximity and impact cross-section to an approaching missile.

10. The deployable and retrievable decoy system for protecting passenger/transport aircraft of claim 9 wherein the impact web unfurls radially outward from around the annular casing of the decoy structure responsive to operational command from the aircraft.

11. A method for protecting passenger/transport aircraft against man portable, heat seeking missiles, comprising the steps of:

a) providing the aircraft with a decoy housing having an aft deployment port;

c) stowing a decoy in the decoy housing, the decoy including,
  (i) an annular casing with an inner cylindrical core defining an annular airflow plenum having an upstream end and a downstream end;
  (ii) normally unfurled radiator petals pivotally secured coaxially around the annular casing the decoy biased for an unfurled position opening outward from the annular casing, each radiator petal structurally supporting and presenting an array of infrared radiation emitters;
  (iii) a turbine-alternator means in the inner cylindrical core of the decoy for receiving and converting air streaming through the annular airflow plenum into electrical power for energizing the arrays of infrared radiation emitters presented by the radiator petals to radiate infrared radiation at peak wavelengths less than 5 microns; and
  (iv) a tether coupler; and d) connecting the decoy via the tether coupler to a tether line that is reeled into and out from the decoy housing upon an operational command from the aircraft;

and upon aircraft take off, e) ejecting the decoy from the decoy housing at a predetermined point after lift off from an airport runway;

f) reeling out the tether line deploying the decoy aft the flying aircraft, allowing the radiator petals to unfurl outward around the decoy and the infrared radiation emitters to radiate responsive to electrical power generated by the turbine-alternator means driven by air streaming through the annular airflow plenum of the decoy;

g) reeling in the tether line preparatory to stowing the decoy at a predetermined safe altitude, positioning the upstream end of the annular airflow plenum through the decoy aft deployment port of the decoy housing for interrupting airflow into the annular air flow plenum allowing the unfurled radiator petals and presented arrays of infrared radiation emitters to cool in the air stream;

h) stowing the decoy within the decoy housing;

then upon aircraft landing, i) ejecting the decoy from the decoy housing at a predetermined altitude on approach before landing on an airport runway;

j) reeling out the tether line deploying the decoy aft the flying aircraft, allowing the radiator petals to unfurl outward around the decoy and the infrared radiation emitters to radiate responsive to electrical power generated by the turbine-alternator means driven by air streaming through the annular airflow plenum of the decoy;

k) reeling in the tether line preparatory to stowing the decoy at a predetermined safe elevation just before touchdown, positioning the upstream end of the annular airflow plenum through the decoy aft the port of the decoy housing for interrupting airflow into the annular air flow plenum allowing the unfurled radiator petals and presented arrays of infrared radiation emitters to cool in the air stream;

l) stowing the decoy within the decoy housing.

12. The deployable and retrievable decoy system of claim 1 or the method of claim 11 for protecting passenger/transport aircraft against man portable, heat seeking missiles wherein the decoy housing comprises a pod having a streamlined low wind resistance front nose secured to an exterior surface of the aircraft.

\* \* \* \* \*